United States Patent [19]

Morris

[11] Patent Number: 5,251,763

[45] Date of Patent: Oct. 12, 1993

[54] CONVEYING APPARATUS AND SEPARATION APPARATUS

[75] Inventor: Christopher P. Morris, Carlton, England

[73] Assignee: Hambro Machinery Limited, United Kingdom

[21] Appl. No.: 392,532

[22] PCT Filed: Nov. 28, 1988

[86] PCT No.: PCT/GB88/01041

§ 371 Date: May 9, 1991

§ 102(e) Date: May 9, 1991

[87] PCT Pub. No.: WO89/04802

PCT Pub. Date: Jun. 1, 1989
(Under 37 CFR 1.47)

[30] Foreign Application Priority Data

Nov. 26, 1987 [GB] United Kingdom ............... 8727701

[51] Int. Cl.[5] .................................................. B07B 4/00
[52] U.S. Cl. ...................................... 209/136; 209/138
[58] Field of Search ................ 209/133, 136–139.1, 209/154

[56] References Cited

U.S. PATENT DOCUMENTS

| 402,440 | 4/1889 | Haggenmacher | 209/137 |
|---|---|---|---|
| 1,668,218 | 5/1928 | Sherban | 209/136 |
| 2,882,097 | 4/1959 | Hamren | |
| 3,655,043 | 4/1972 | Wochnowski et al. | 209/154 |
| 4,033,555 | 6/1977 | Fong | |
| 4,045,334 | 8/1977 | Ferrary et al. | 209/154 |
| 4,812,085 | 3/1989 | Merz | |

FOREIGN PATENT DOCUMENTS

| 0189005 | 6/1986 | European Pat. Off. | |
|---|---|---|---|
| 88402 | 9/1896 | Fed. Rep. of Germany | |
| 2553072 | 4/1985 | France | |
| 1162105 | 5/1986 | U.S.S.R. | 209/139.1 |
| 1532091 | 12/1989 | U.S.S.R. | 209/154 |
| 2149374A | 6/1985 | United Kingdom | |

Primary Examiner—Joseph E. Valenza
Attorney, Agent, or Firm—Jones & Askew

[57] ABSTRACT

An elutriator for separating different grades of leaf material and having a distribution means, an elutriation zone (100) disposed above the distribution means, and a fluid supply fan (113) for supplying a fluid to me zone through the distribution means. The distribution means comprises two distribution plates (10) which diverge in an upward direction, each distribution plate being configured to direct the fluid therethrough in a direction which has a component extending along a surface of the plate. In use, the velocity of air delivered to the elutriation zone is greater than the terminal velocity of at least one grade of the material to be separated.

3 Claims, 7 Drawing Sheets

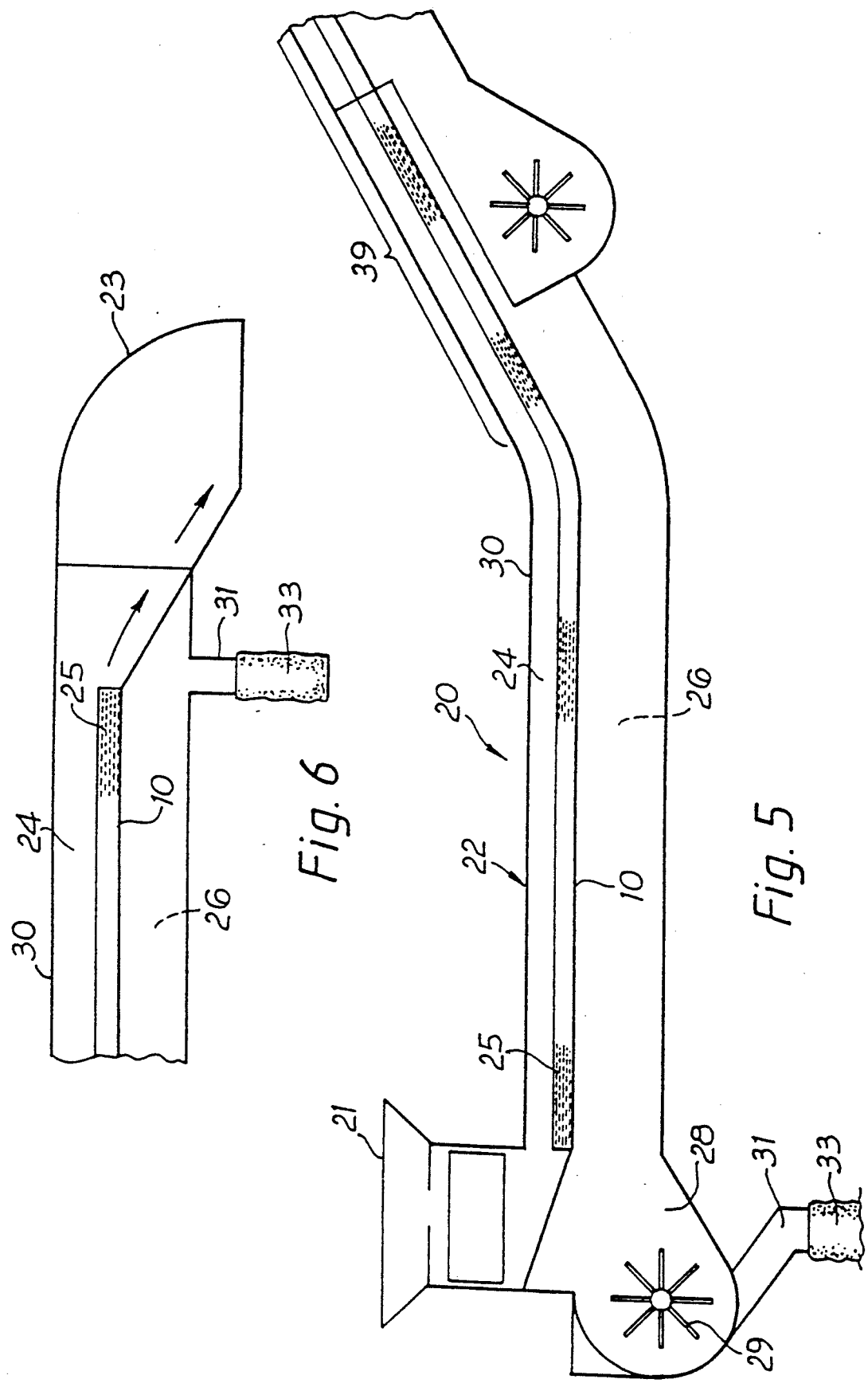

CONVEYING APPARATUS AND SEPARATION APPARATUS

BACKGROUND OF THE INVENTION

This invention relates to a conveying apparatus and to a separation apparatus.

There are a number of known apparatus for conveying material such as tobacco or tea. One apparatus is a vibratory conveyor in which the material is thrown forward by asymmetric vibration. Another apparatus is a pneumatic conveyor in which the material is carried in a high velocity air stream; in order to convey the material properly the air stream speed must be several thousand feet per minute.

Both these methods cause considerable degradation to the leaf material. This results in the creation of "dust" and reduces the percentage of the material which is useful for further processing. The dust may be created by the breakage of the leaf material into smaller pieces, and also by the separation of small particles which are attached to the leaf material. Usually expensive separation apparatus needs to be provided to collect the dust.

Reference is made to the following patent specifications, each of which discloses the conveying of a material using an air stream: EP-A-189005; U.S. Pat. No. 4,033,555; FR-A-2553072; DE-C-88402; and U.S. Pat. No. 2,882,097.

Conventionally, air-borne matter such as matter conveyed by a low pressure pneumatic conveyor is separated from the air stream by a mechanical device, such as a cyclone. These devices, however, are generally large and expensive items of equipment.

In GB-A-1,095,904 there is described an air filtering apparatus which is particularly suitable for removing fibre waste from an air stream. The apparatus has an inlet, an air outlet and a waste outlet. An air permeable screen is disposed between the inlet and the air outlet; the air permeable screen is not permeable to the fibre waste.

In GB-A-1,122,705 there is described an apparatus for separating solid particles entrained in a gas stream. As with GB-A-1,095,904 the apparatus includes an inlet, a gas outlet, a solid particle outlet, and a gas permeable screen disposed between the inlet and the gas outlet. The screen can be formed of a perforated sheet metal or a wire mesh.

Another apparatus for separating air-borne matter from an air stream is described in GB-A-1,575,175.

When designing this type of separation apparatus it is advantageous for the separator to be as small as possible in order to reduce manufacturing costs, and to reduce the amount of space taken up by the separator.

However, when the apparatus is made smaller the air-borne matter tends to accumulate on the screen and this increases the load on the fan forcing the air through the separator. This problem is solved in GB-A-1,575,175, where the structure of the separator is carefully selected to reduce to a minimum any accumulation on the screen.

Another type of separation apparatus, known as an elutriator is disclosed in EP-A-159890.

SUMMARY OF THE INVENTION

According to one aspect of the present invention there is provided a conveying apparatus characterised by a distribution plate having a plurality of apertures therein whereby a fluid can flow through the plate, a conveying zone disposed above said distribution plate, and fluid supply means for supplying a fluid to said conveying zone through the distribution plate, wherein said distribution plate is adapted to direct the fluid therethrough in a direction which has a component extending along a surface of the plate, whereby a material disposed in the conveying zone is conveyed along said surface of the plate.

The best results are obtained when the material disposed in the conveying zone is fluidised by the air stream.

Advantageously at least some of the apertures extend through the plate at an acute angle to the surface of the plate. Preferably the angle is in the range of 10° to 60° more preferably 20° to 45°.

The cross-sectional area of each aperture may vary through the plate. However, the minimum cross-sectional area of each aperture may be in the range $20 \times 10^{-6}$ sq. inches (approximately $130 \times 10^{-6}$ cm$^2$) to $1000 \times 10^{-6}$ sq. inches (approximately $6450 \times 10^{-6}$ cm$^2$), preferably $80 \times 10^{-6}$ sq. inches (approximately $520 \times 10^{-6}$ cm$^2$) to $700 \times 10^{-6}$ sq. inches (approximately $4520 \times 10^{-6}$ cm$^2$) more preferably $170 \times 10^{-6}$ sq. inches (approximately $1100 \times 10^{-6}$ cm$^2$) to $500 \times 10^{-6}$ sq. inches (approximately $3220 \times 10^{-6}$ cm$^2$), and most preferably $300 \times 10^{-6}$ sq. inches (approximately $1940 \times 10^{-6}$ cm$^2$).

Preferably the total area of the apertures is in the range 1% to 12% of the total area of the plate.

The thickness of the plate is preferably in the range 5 thou to 30 thou ($12.7 \times 10^{-3}$ cm to $77 \times 10^{-3}$ cm), more preferably 15 thou to 25 thou ($19.1 \times 10^{-3}$ cm to $63.8 \times 10^{-3}$ cm), most preferably about 20 thou ($51 \times 10^{-3}$ cm).

The plate may be any suitable material such as a plastics or metallic material. Preferably the plate is stainless steel.

The apertures in the plate may be produced by any convenient method, such as punching, laser beam drilling or chemical milling. Photo-etching is the preferred method for forming the apertures.

The apertures may be of any desired cross-sectional shape. However, it is preferred that the apertures are of substantially circular or rectangular cross-section.

Typically the fluid is a gaseous medium such as air.

The number of apertures per square inch of plate can be varied widely. Typically between about 20 to 250, more preferably 20 to 100, apertures per square inch is useful in conveying apparatus. However, the preferred number of apertures per square inch is about 40.

Advantageously the conveying apparatus further includes a first plenum chamber disposed below the distribution plate, and the fluid supply means is arranged to deliver the fluid to the first plenum chamber. The fluid supply means is preferably a fan.

Desirably the conveyor includes a channel along which the material is conveyed, and the distribution plate may form at least part of the channel.

The channel may be of rectangular cross-section, U-shaped cross-section, V-shaped cross-section, or circular cross-section, for example.

It is preferred that the distribution plate comprises at least a lower portion of the channel.

In an advantageous construction the channel comprises a base and side walls and at least part of the at least one side wall is provided with apertures communicating with a second plenum chamber, which is preferably in communication with first fluid withdrawal means.

It is preferable that the first fluid withdrawal means is the same as the fluid supply means.

Advantageously the apertures in the or each side wall are adapted to direct the fluid therethrough in a direction which has a component extending along the surface of the or each side wall. It is particularly preferred that this direction is selected so that the fluid flows through apertures in the or each side wall in a direction having a component which is opposed or at 90° to the forward direction in which the material is conveyed.

The apertures in the or each side wall may have the same size and spacing as the apertures in the distribution plate, and may serve as a filter to prevent large particles being removed by the first fluid withdrawal means. Preferably, however, there are 200-300, more preferably, 240 holes per square inch on the side wall.

Preferably a cover is provided over said conveying zone. The cover may be secured to, or integral with the channel, and serves to prevent material being inadvertently discharged from the conveyor.

In one construction, the cover is air-porous. In this construction a third plenum chamber may be disposed above the cover. Second fluid withdrawal means may be provided in communication with the third plenum chamber; the second fluid withdrawal means may be a fan.

If desired the fluid supply means may be the same as the third fluid withdrawal means.

The air-porous cover may act as a filter to prevent large particles of dust being removed by the third fluid withdrawal means.

However, the conveyor according to the invention does not create very much dust because the material is conveyed in a relatively gentle manner compared with other types of conveying apparatus.

The conveying apparatus is particularly useful for conveying leaf material such as tea or tobacco. The conveying apparatus may also be used with a wide variety of food products, for example low density cereals.

According to another aspect of the invention there is provided an elutriator for separating different grades of a material, characterised by distribution means an elutriation zone disposed above the distribution means, fluid supply means for supplying a fluid to said zone through the distribution means, said distribution means comprising two distribution plates which diverge in an upward direction, each distribution plate being adapted to direct the fluid therethrough in a direction which has a component extending along a surface of the plate, and wherein, in use, the velocity of air delivered to the elutriation zone is greater than the terminal velocity of at least one grade of the material to be separated.

Preferably, at least some of the apertures are arranged at an acute angle to the plate; this angle is preferably 10° to 60°, more preferably 20° to 45°.

Advantageously the distribution plate is arranged at an angle to the vertical which is substantially the same as the angle of the apertures to the surface of the plate. This provides an upward air flow which is substantially vertical.

The arrangement is desirably such that the two plates are arranged symmetrically about a vertical plane with equal but opposite angles to said plane. A material outlet for high terminal velocity material may be provided between the plates.

In a particularly preferred construction selected areas of the plate are provided with apertures having different angles to the surface of the plate.

Desirably first and second areas are provided, each area extending substantially entirely across the plate, said first and second areas being arranged alternately from one end of the plate to the other.

The apertures in the first areas may be arranged at an angle of substantially 90° to the surface of the plate (i.e. with no component along the surface of the plate), and the apertures in the second areas may be arranged at an angle substantially equal to the angle of inclination of the plate to the vertical (so that the resultant air flow through these areas is substantially vertical). This particular arrangement has been found to provide especially good results.

A third distribution plate is preferably provided between the first and second plates, above the material outlet for the high terminal velocity grades.

The percentage open area of the plates is preferable 4% to 12%, more preferably 8% to 9%, and most preferably substantially 8.6% of the total area of the plate.

The fluid supply means may comprise a fan.

The distribution device may provide a pressure drop across the plate of between 0.5 inch to 2.5 inches gauge (approximately 1.25 cm to 6.25 cm), preferably about 1.5 inches gauge (approximately 1.88 cm).

The elutriator may be fed from a fluid conveyor as described above. In this case the conveyor may act as the pretreatment zone described in EP-A-159890.

The elutriator is particularly suitable for separating grades of leaf material such as tea and tobacco, especially threshed tea and tobacco.

It should be noted that the material may comprise a mixture of two or more different substances (in which case the term "grade" can be construed as referring to different substances) or may comprise a single substance having a plurality of different grades. For example, in the elutriation of tobacco a heavier grade would comprise stem whilst a lighter grade would comprise leaf.

According to another aspect of the present invention there is provided apparatus for separating a material entrained in a gas stream, characterised by a housing having an inlet for entrained material, a first outlet for the gas stream, a second outlet for material separated from the gas stream, and a gas permeable screen arranged between the inlet and the first outlet, wherein said screen comprises a perforated plate in which substantially all the apertures of the plate have a cross-sectional area in the range $20 \times 10^{-6}$ sq. inches (about $130 \times 10^{-6}$ cm$^2$) to $1000 \times 10^{-6}$ sq. inches (about $6450 \times 10^{-6}$ cm$^2$), and the total area of the apertures is in the range 4% to 12% of the total area of the plate.

It will be appreciated that the screen may comprise a single perforated plate, or may comprise a plurality of perforated plates secured together.

Advantageously, the area of each aperture is greatest on the side of the plate facing the first outlet.

In another advantageous construction the plate is such that the apertures are disposed at an angle to the surface of the plate. Preferably the angle is in the range 10° to 60°, more preferably 20° to 45°.

The arrangement of the apertures is preferably such that they extend upwardly away from the second outlet. This increase results in increased turbulence in the air flowing through the plate, thereby helping to prevent the material from accumulating on the screen.

In one embodiment the area of each aperture increases from one side of the plate to the other.

This arrangement facilitates easy manufacture of the plate. Also, because the material is on the side of the plate with the smallest aperture size, the material does not tend to stick in the apertures.

In another embodiment the aperture area is minimum about midway along its length. This arrangement increases the turbulence of the air flow and helps to prevent the material accumulating on the screen.

The apertures preferably have a cross-sectional area in the range $80 \times 10^{-6}$ sq. inches (about $520 \times 10^{-6}$ cm$^2$) to $700 \times 10^{-6}$ sq. inches (about $4520 \times 10^{-6}$ cm$^2$), more preferably in the range $170 \times 10^{-6}$ sq. inches (about $1100 \times 10^{-6}$ cm$^2$) to $500 \times 10^{-6}$ sq. inches (about $3220 \times 10^{-6}$ cm$^2$), and most preferably $500 \times 10^{-6}$ sq. inches (about $1940 \times 10^{-6}$ cm$^2$).

The total area of the apertures is preferably in the range 5% to 9%, more preferably 8% to 9%, and most preferably about 8.6%, of the total area of the plate.

The thickness of the plate is preferably in the range 20 thou to 40 thou (about $51 \times 10^{-3}$ cm to about $102 \times 10^{-3}$ cm), more preferably 28 thou to 36 thou (about $71 \times 10^{-3}$ cm to about $91 \times 10^{-3}$ cm).

The apertures preferably have a circular cross-sectional shape, in which case the diameter of each aperture is in the range 5 thou (about $12.7 \times 10^{-3}$ cm) to 35 thou (about $89 \times 10^{-3}$ cm), more preferably 10 thou (about $25.4 \times 10^{-3}$ cm) to 30 thou (about $77 \times 10^{-3}$ cm), more preferably 15 thou (about $38 \times 10^{-3}$ cm) to 25 thou (about $62.5 \times 10^{-3}$ cm), and most preferably 20 thou (about $51 \times 10^{-3}$ cm).

The plate may be, for example, a metallic or plastics material; the preferred material is stainless steel.

The apertures in the plate may be produced by any convenient method, for example, by punching, by laser beam drilling, or by chemical milling such as photoetching. Photo-etching is the preferred manufacturing technique.

When the cross-sectional area of the apertures varies through the plate then the above defined aperture cross-sectional areas should be understood to refer to the minimum area of the apertures through the plate.

Desirably the housing includes a duct connecting the inlet to the outlet. The duct may increase in cross-sectional area in a direction away from the inlet.

The screen can be arranged to form at least part of one wall duct, so that the screen and an opposite wall of the duct form two opposite sides of a rectangular cross-section.

The screen and said opposite wall may be disposed at an angle to one another in the range 10° to 20°.

The inlet is provided with an inlet axis which may be arranged at an angle of 25° to 45° to the plane of the screen.

The screen terminates in an end wall which may be arranged at an angle of 115° to 135° to the plane of the screen.

Air lock means is preferably arranged at the second outlet, and the air lock means comprises a rotary air lock.

A deflector plate can be arranged opposite the inlet to deflect incoming air downwardly into the housing.

According to a further aspect of the invention there is provided apparatus for separating a material entrained in a gas stream, comprising a housing having an inlet for entrained material, a first outlet for the gas stream, a second outlet for material separated from the gas stream, and a gas permeable screen arranged between the inlet and the first outlet, wherein said screen comprises a perforated plate in which the area of each aperture increases from one side of the plate to the other.

Advantageously, the area of each aperture is greatest on the side of the plate facing the first outlet.

According to a further aspect of the invention there is provided apparatus for separating a material entrained in a gas stream, comprising a housing having an inlet for entrained material, a first outlet for the gas stream, a second outlet for material separated from the gas stream, and a gas permeable screen arranged between the inlet and the first outlet, wherein said screen comprises a perforated plate in which the apertures of the plate are disposed at an angle to the surface of the plate.

The apparatus according to the second or third aspect of the invention may be provided with any desired combination of the features of the apparatus according to the first aspect of the invention.

According to another aspect of the invention there is a method of separating a material entrained in a gas stream comprising introducing the material entrained in the gas stream into the inlet of an apparatus as described above, and discharging separated material from the second outlet thereof.

The method and apparatus described above may be used in a wide variety of applications. The invention is especially suitable for use with irregularly shaped low density materials, particularly food, tobacco, paper and tea.

The method and apparatus according to the invention provides an improved separation apparatus which helps to prevent the material from accumulating on the screen. This is believed to be partly due to the improved turbulence provided by the apertured plate, and partly due to the substantially smooth surface of the plate.

The method and apparatus requires less power from the fan than the prior art. Also, the method and apparatus can remove even small particles of dust from the gas stream. This obviates the need to use an additional filter to remove the dust.

The separation apparatus according to the invention is particularly useful for separating irregularly shaped low density materials, such as tobacco, tea and paper, from air.

The particular advantage which the separation apparatus of the present invention has over the apparatus described in GB-A-1575175 is that it creates extra turbulence around the plate which prevents the airborne material from sticking to the plate. Because of this the design parameters for the separation apparatus according to the present invention are not so critical as for the apparatus described in GB-A-1575175.

BRIEF DESCRIPTION OF DRAWING

Reference is now made to the accompanying drawings, in which:

FIG. 5 is a side elevation of a conveying apparatus according to the invention provided with an inclined portion;

FIG. 6 is a side elevation of a conveyor according to the invention showing the discharge point;

DESCRIPTION OF PREFERRED EMBODIMENT

Figure 1:
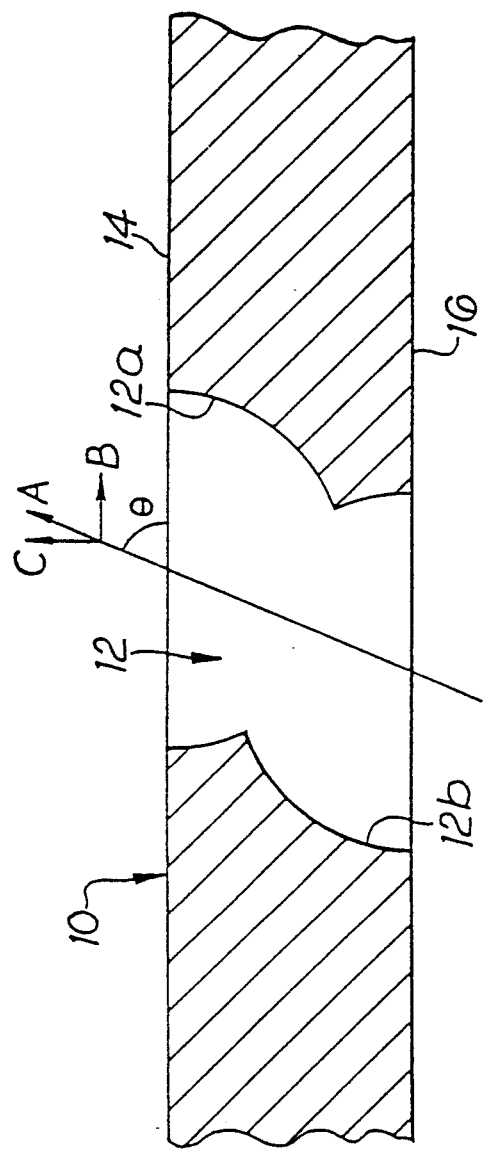
FIG. 1 is a cross sectional view of a distribution plate for use in the invention.

Referring to FIG. 1 a distribution device according to the invention comprises a plate 10 having a plurality of apertures 12 (of which only one is shown) extending between upper and lower surfaces 14 and 16 thereof.

The apertures 12 are disposed at an acute angle $\theta$ to the upper and lower surfaces 14 and 16; the angle $\theta$ is preferably about 45°. The precise choice of the size of the angle $\theta$ depends upon the particular application of the plate 10.

The general direction A of air flowing upwardly through the plate 10 will be at the angle $\theta$ to the surfaces 14 and 16. The air flow direction A can be broken into two orthagonal directional components B and C; the directional component B is substantially parallel to the surfaces 14 and 16, whilst the directional component C is substantially transverse to the surfaces 14 and 16.

Thus, if air is blown upwardly through the plate 10, then any material on the upper surface 14 will have motion imparted to it in directions B and C. The directional component C can act to fluidise the material, whilst the directional component B can act to convey the material forward.

It will be observed that the apertures 12 comprise upper and lower components 12a and 12b. This arrangement is produced when the apertures are produced by photo-etching techniques involving etching the apertures from both sides of the plate. In this case the angle $\theta$ of the apertures 12 can be considered as the angle between the surface 14 of the plate 10 and the line extending between the centres of the apertures 12a and 12b in the surfaces 14 and 16.

In FIGS. 2 to 7 a conveying apparatus 20 comprises a conveying channel 22 defined by a base formed of a plurality of juxtapositioned distribution plates 10 and side walls 24 upstanding from the plates 10. The channel 22 defines a conveying zone for material to be conveyed.

A first plenum chamber 26 is disposed beneath the plates 10 and is provided with an inlet 28 which can be connected to an air supply fan 29. A cover 30 is disposed on top of the side walls 24.

When the material to be conveyed is placed in the channel 22 it is fluidised by air supplied by the fan passing through the apertures 12 of the plates 10. Furthermore, the air applies a force to the material having the directional component B which causes the material to be conveyed along the surface 14 of the plate 10.

A lower portion of each side wall 24 is provided with a plurality of apertures 25. The apertures 25 are similar to the apertures 12 and they extend through the side walls 24.

A second plenum chamber 27 is arranged on the opposite side wall of the side walls 24 to the conveying zone. The plenum chamber is in fluid communication with the fan 29, so that the fan 29 acts to withdraw air from the conveying channel 22 through the apertures 25. The apertures 25 are arranged at such an angle that air flowing through the apertures 25 into the second plenum chamber 27 flows in a direction which has a component opposite to the direction B.

More than one fan 29 can be provided, depending on the length of the conveyor 20; in FIG. 1 two fans 29 are provided. Each fan 29 is provided with a dust collection duct 31 having a dust collection bag or bin 33 secured to the free end thereof; the arrangement of this type of duct 31 and bin 33 is well known.

The conveyor 20 has an inlet 21 and an outlet 23 (see FIG. 6). A further dust collection duct 31 and bin 33 can be provided at the outlet.

The bin 33 acts to filter dust from the air fed from the plenum chamber 27 to the fan 29.

Figure 4:
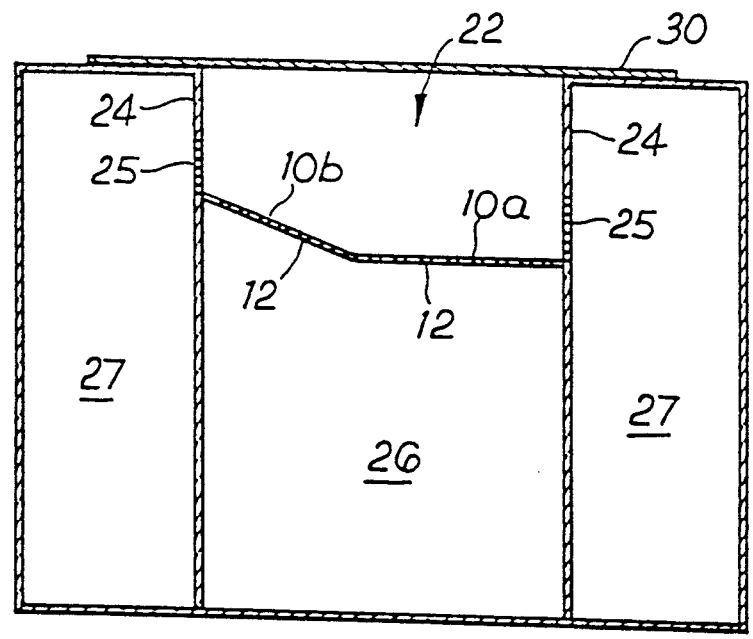
FIG. 4 is a cross sectional view of a conveying apparatus according to the invention, showing the configuration at a bend.

FIG. 4 shows the configuration of the conveyor 20 at a bend. It will be observed that the plate 10 is provided with two portions 10a and 10b, with the portion 10b being arranged at an angle to the horizontal. The arrangement shown in FIG. 4 would be suitable for a right-hand bend, assuming the direction of conveying is into the plane of the drawing.

FIG. 5 shows a conveyor 20 having a inclined portion 39, so that the material to be conveyed can be conveyed up an inclination.

Figure 7:
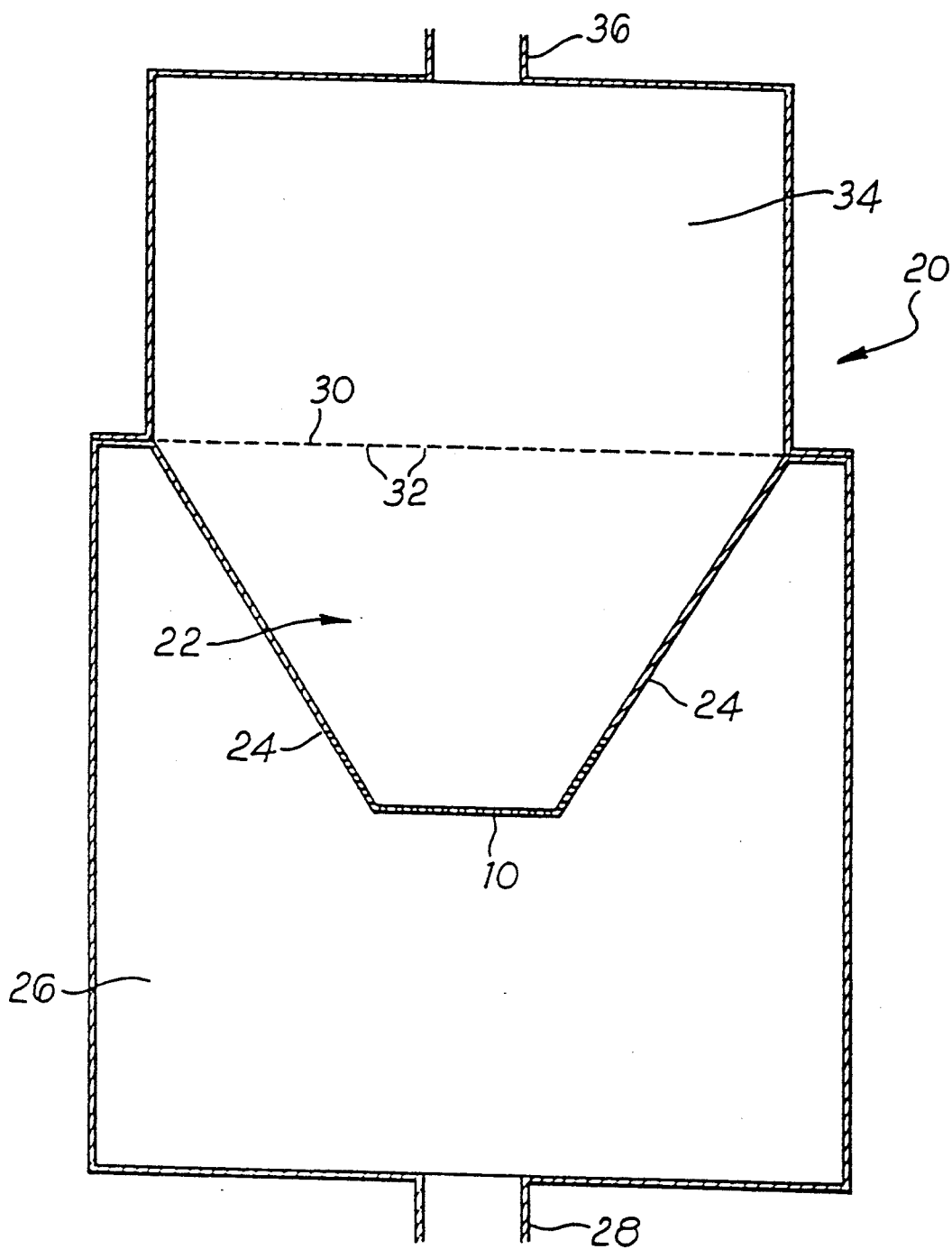
FIG. 7 is a cross sectional view of an alternate embodiment of a conveying apparatus according to the invention.

FIG. 7 shows another embodiment in which a third plenum chamber 34 replaces the second plenum chamber 27 shown in FIGS. 1 to 5. The third plenum chamber 34 is disposed above the cover 30, and the cover is provided with apertures 32. The third plenum chamber 34 is provided with an outlet 36 which can be connected to the fan 29.

In the above embodiments the perforated cover 30 or perforated side walls 24 act as a filter to remove dust from the conveying channel 22, without removing the large particles. This dust is, in turn, collected at the dust bins 33.

Figure 8:
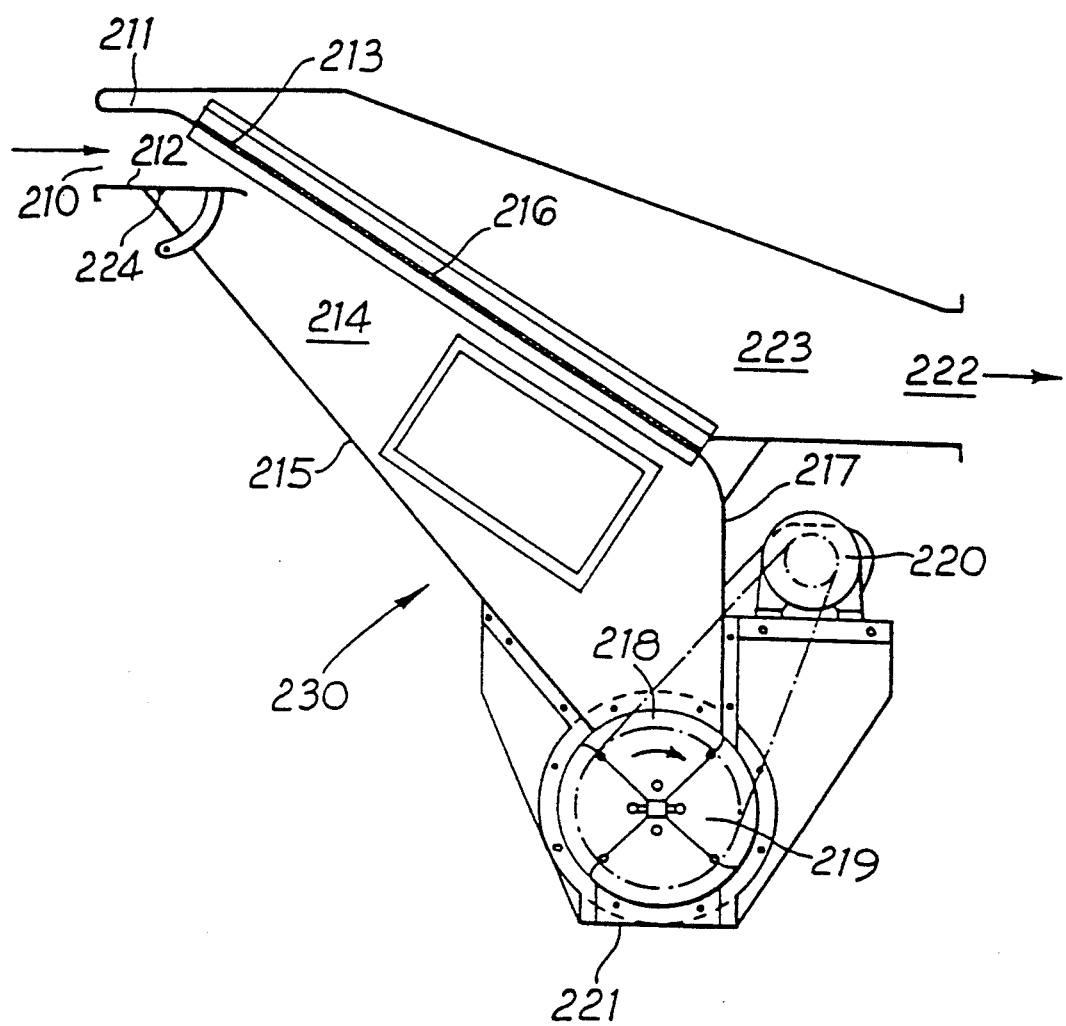
FIG. 8 is a cross sectional view of a separation apparatus according to the invention.

Referring to FIG. 8, a separation apparatus is shown. The apparatus comprises a housing 230 having an inlet 210 for entrained material; the inlet 210 is defined by a pair of baffles 211 and 212. Opposite said inlet 210 there is provided a deflector plate 213 to deflect the entrained material into a separating zone 214.

The zone 214 is rectangular in cross-section and increases in cross-sectional area away from said inlet 110. It is defined by a lower wall 215 and, on the opposite side, by an air permeable screen 216.

A first outlet 222 for air is provided in the housing 230 and extends on the opposite side of the screen 216 to the inlet 210.

The screen 216 comprises a perforated stainless steel plate having circular apertures of about 20 thousandths of an inch (about $51 \times 10^{-3}$ cm) diameter, and having a total area which is about 8.6% of the total area of the plate. The apertures of the screen 216 extend therethrough at an angle to the surface of the screen 216. The screen 216 may be of the same construction as the plate 10 shown in FIG. 1.

The screen 216 terminates in an end wall 217 which, together with the wall 215, defines an inlet 218 to an air-lock device 219. The air-lock device 219 is arranged to rotate in a clockwise direction and to be driven by a motor 220. A second outlet 221, for the material to be separated, is provided at the lower end of said air-lock device 219.

The device functions as follows: air carrying entrained material from, for example, a low pressure pneumatic conveyor enters the inlet 210 and is deflected by the baffles 211 and 212 and the deflector plate 213 so as to enter the separation zone 214. As shown the baffle 212 is adjustable about pivot 224 to provide the desired air flow.

As the air is decelerated in the zone 214 air tends to pass through the screen 216 towards the outlet 222 and separated material tends to fall towards the rotating air-lock device 219 whereby it is discharged via the outlet 221. It is found in practice that a boundary layer of air is formed along the surface of screen 216 as a result of which there is no tendency for air-borne materials to adhere to the screen.

By driving the air-lock device 219 in the same direction as the product flow a smooth deceleration is obtained which tends to result in lower degradation of the product.

The separation apparatus as described above is found to be extremely convenient for separating low density materials from a stream of air, particularly irregularly shaped low density materials. Such materials may be fibrous vegetable materials such as paper, tobacco or tea.

Figure 9:
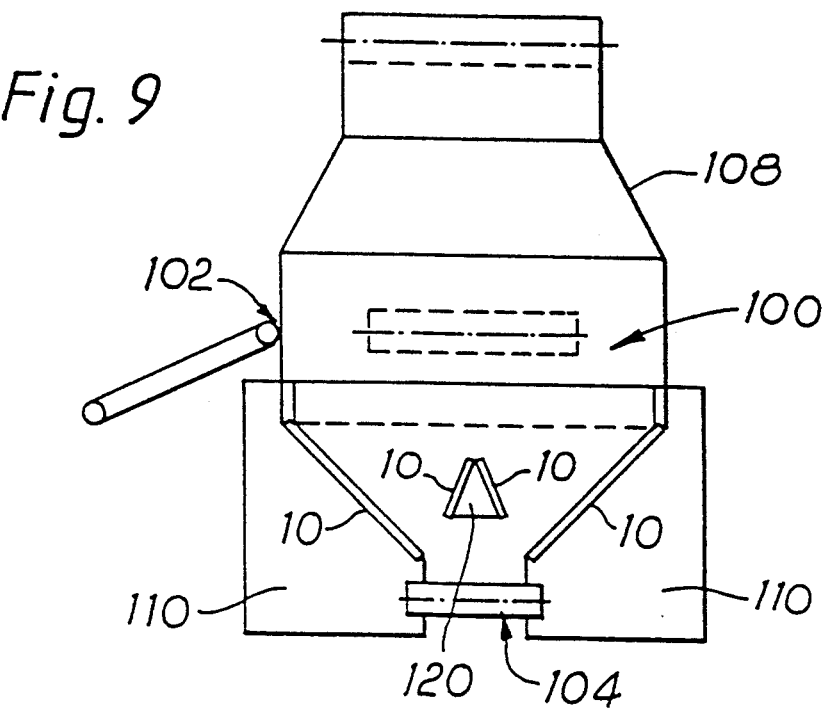
FIG. 9 is an end elevation of an elutriator according to the invention.
Figure 10:
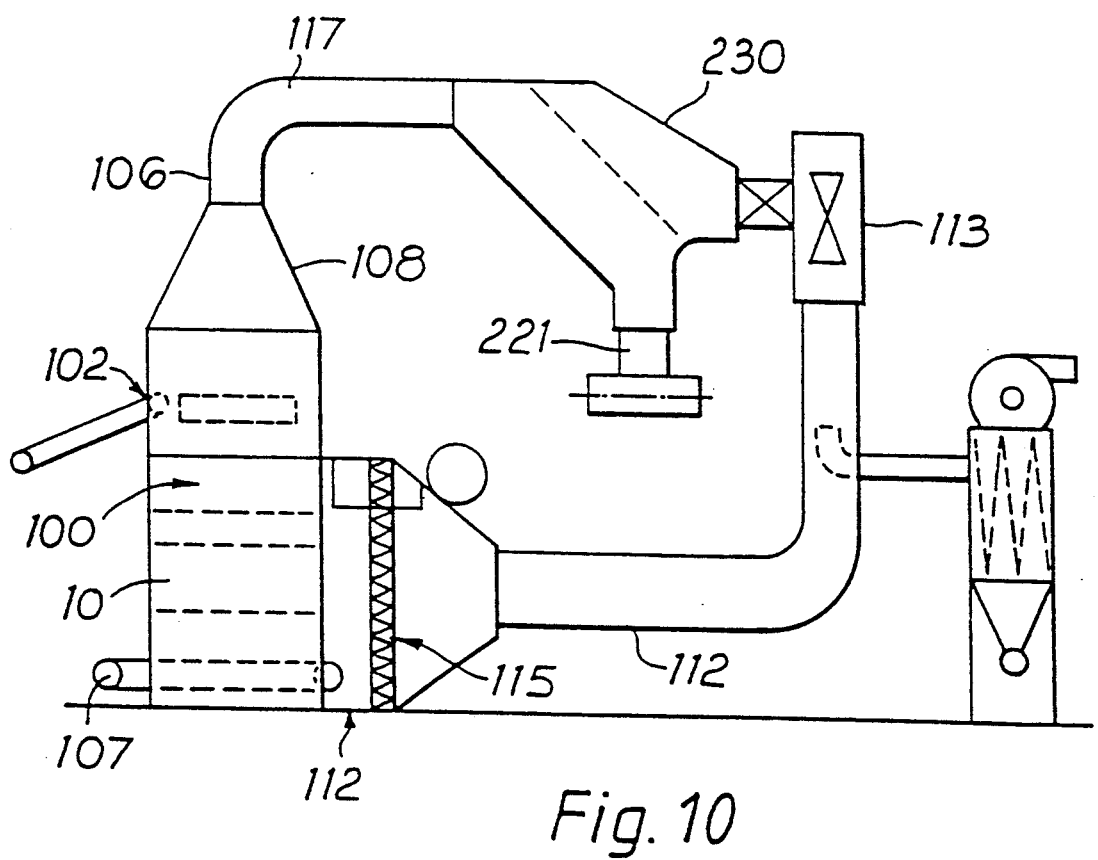
FIG. 10 is a side elevation of the elutriator shown.
Figure 11:
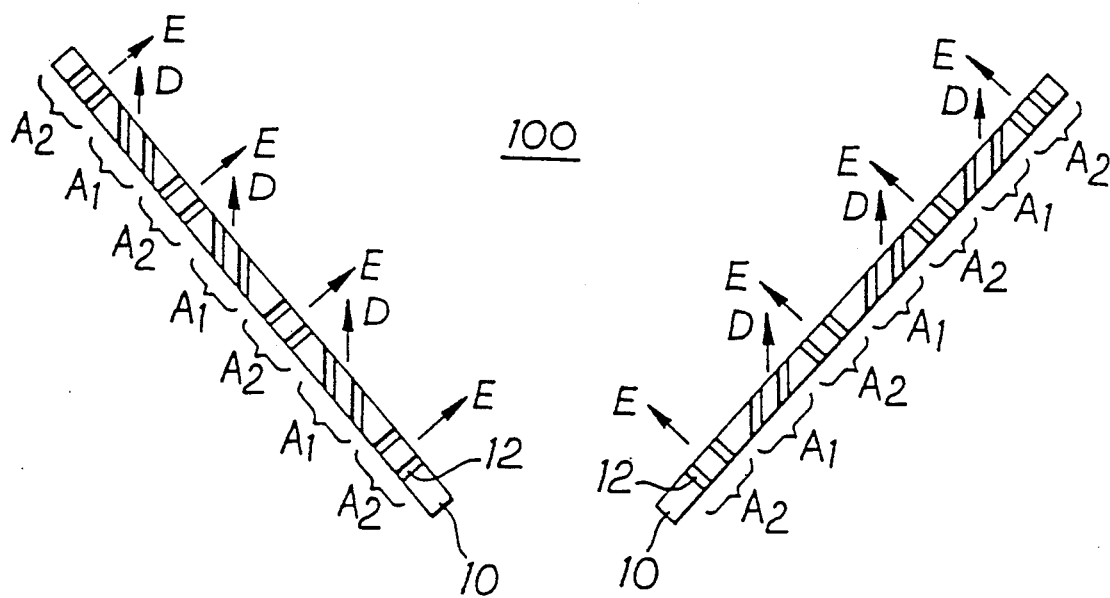
FIG. 11 is an enlarged view of the diverging plates shown in FIGS. 9 and 10.

In FIGS. 9 and 10 an elutriator is shown schematically. The elutriator includes an elutriation zone 100 arranged above two of said distribution plates 10. It will be appreciated that more than two plates 10 can be employed. The plates 10 are arranged at an angle to the vertical.

The elutriator is provided with a material inlet 102; a high terminal velocity material outlet 104 is disposed between the plates 10, and a low terminal velocity material outlet 106 is provided at the top of a hood 108. The hood 108 is disposed over the plates 10 and the elutriation zone 100.

Figure 2:
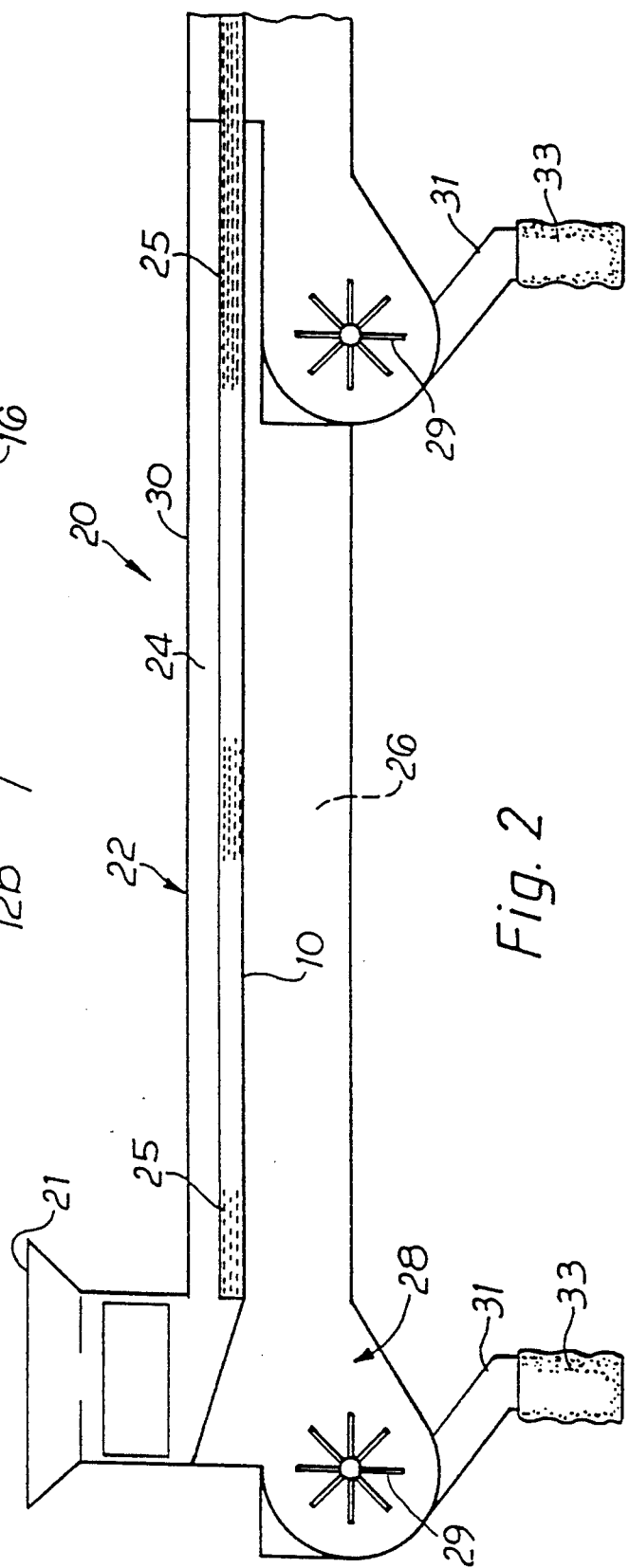
FIG. 2 is a schematic elevation in cross-section of a conveying apparatus according to the invention.
Figure 3:
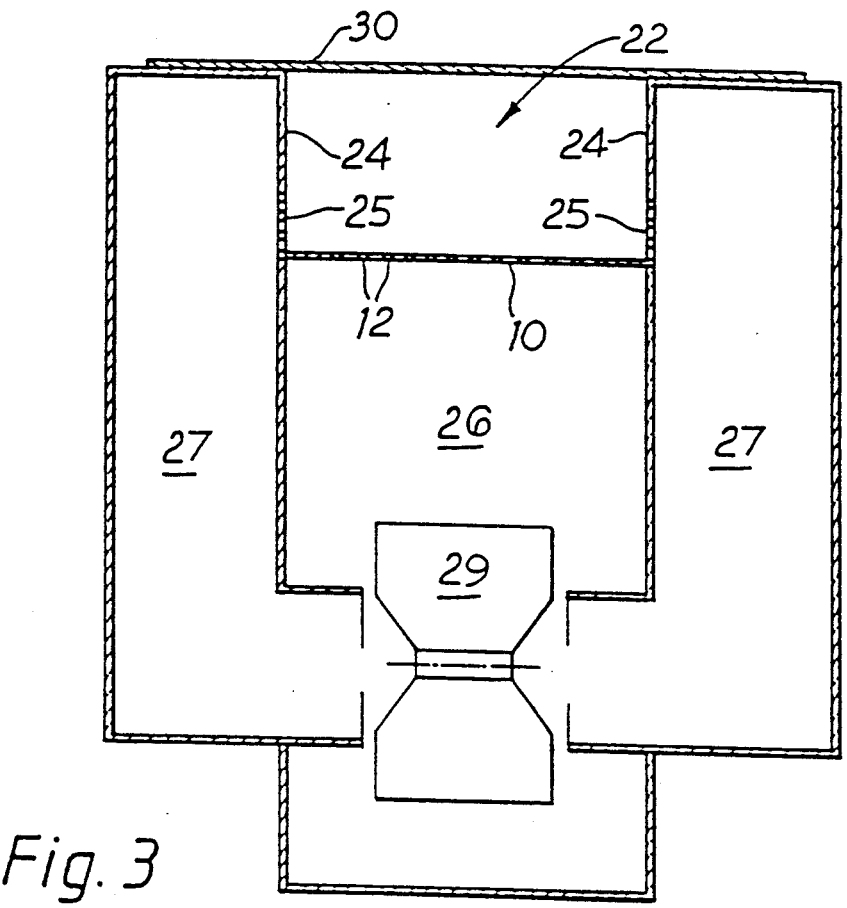
FIG. 3 is a cross section of through the conveying apparatus shown in FIG. 1.

A conveyor 107 is disposed below the material outlet 106. The conveyor 107 may be a conveyor as shown in FIG. 2. Also, an air lock (not shown), such as a rotary air lock, may be disposed at the material outlet 104.

A plenum chamber 110 is disposed on the opposite sides of each pair of plates 10 to the elutriation zone 100. Each plenum chamber 110 is provided with an inlet duct 112 which can be connected to a fan 113. The fan 113 delivers air to the plenum chambers 110 which enters the elutriation zone 100 through the plates 10. A filter 115 (which can be a mesh) is disposed in the duct 112.

The outlet 106 may also be connected to the fan 113 to draw air from the elutriation zone 100.

The general principles behind the operation of this type of elutriator are described in detail in EP-A-159890.

The air supply fan 113 supplies air at a rate such that the velocity of air in the elutriation zone 100 is greater than the terminal velocity of the material which it is desired to obtain as top product in the outlet 106. The material of greater terminal velocity falls to the outlet 104. The plates 10 are adapted to provide a substantially uniform flow rate of air to the elutriation zone 100 in order to reduce the air flow rate required to effect separation (as described in EP-A-159890).

One of the separators 230 is disposed in a duct 117 which extends between the outlet 106 and the fan 113. The top product is discharged through the outlet 221 of the separator housing 230.

Additional distribution plates 10 are disposed above the material outlet 104 between the diverging plates 10.

Another plenum chamber 120 is defined within the additional distribution plates 10, and the chamber 120 may be supplied by the fan 113 through the duct 112; alternatively an additional fan (not shown) can be provided.

The apertures of the diverging plates 10 can be arranged into two types of area each extending substantially across the entire width of the plate 10, and each area being arranged alternately from the lower end of the plates 10 to the upper end; in FIGS. 9 and 10 the areas are designated $A_1$ and $A_2$ respectively.

In area $A_1$ the apertures 12 in each plate 10 are arranged at the angle $\theta$ to the surface of the plate 10. Thus air flowing through the apertures 12 of the plate 10 in the area $A_1$ flows substantially vertically upwards to the elutriation zone 100, as shown by arrows D.

In area $A_2$ the apertures 12 in each plate 10 are arranged at substantially a 90° angle to the surface of the plate 10. Thus air flowing through the apertures 12 of the plate 10 in the area $A_2$ flows substantially orthogonally through the plate 10 to the elutriation zone, in the direction E.

The areas $A_1$ and $A_2$ can, if desired, also be provided on the additional plates 10.

I claim:

1. An elutriator for separating different grades of leaf material and comprising distribution means, an elutriation zone disposed above the distribution means, fluid supply means for supplying a fluid to said zone through the distribution means, said distribution means comprising two distribution plates which diverge in an upward direction, each distribution plate being operative to direct the fluid therethrough in a direction which has a component extending along a surface of the plate by way of having areas provided with apertures at angles relative to the surface of the plates, said areas comprising first and second areas each extending substantially entirely across the plate, said first and second areas being arranged alternately from one end of the plate to the other with the apertures in the first areas being of an angle relative to the surface of the plate different from the angle of the apertures in the second areas relative to the surface of the plate, wherein, in use, the velocity of air delivered to the elutriation zone is greater than the terminal velocity of at least one grade of the material to be separated.

2. An elutriator according to claim 1, wherein the apertures in the first areas are arranged at an angle of substantially 90° to the surface of the plate, and the apertures in the second areas are arranged at an angle substantially equal to the angle of inclination of the plate to the vertical.

3. An elutriator for separating different grades of leaf material, comprising a distribution means, an elutriation zone disposed above the distribution means, fluid supply means for supplying a fluid to said zone through the distribution means, said distribution means comprising two distribution plates which diverge in an upward direction, each distribution plate having areas provided with a plurality of apertures arranged at an angle relative to a surface of the plate, with the angle of the apertures in one said area being different from the angle of the apertures in another said area so as to direct the fluid therethrough in a direction which has a component extending along a surface of the plate, wherein, in use, the velocity of air delivered to the elutriation zone is greater than the terminal velocity of at least one grade of the material to be separated.

* * * * *